April 24, 1973  G. J. CARPENTER  3,729,356
METHOD OF MAKING CEMENTED FIBER OPTICAL DEVICES
Filed March 8, 1971
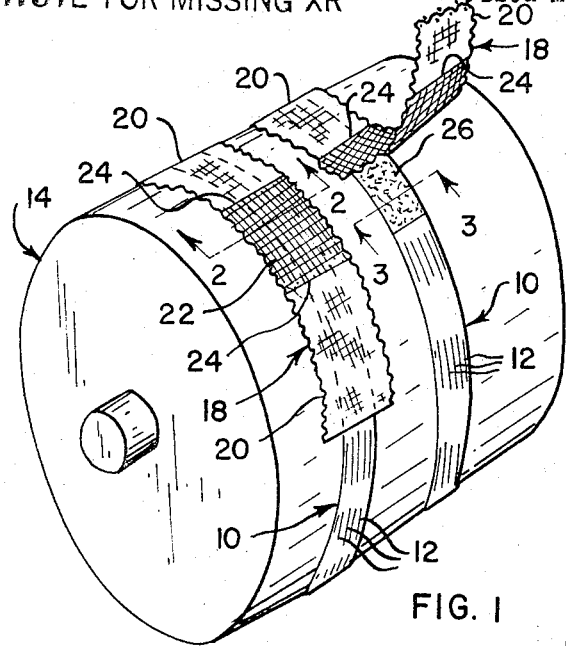
FIG. 1
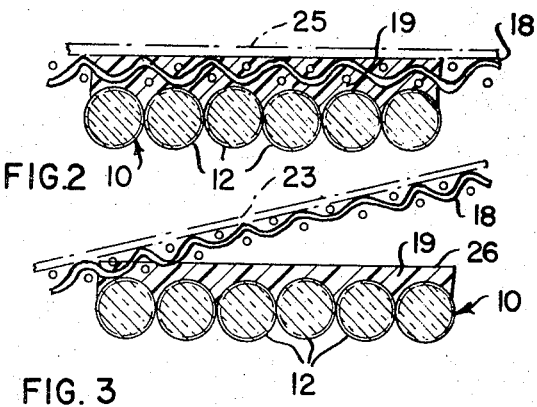
FIG. 2
FIG. 3
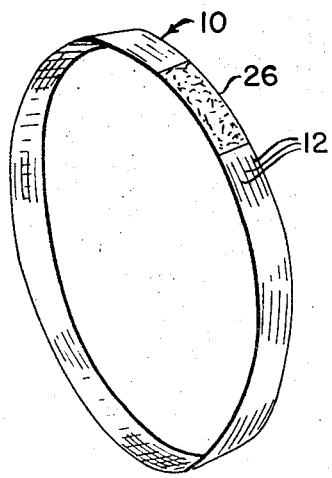
FIG. 4
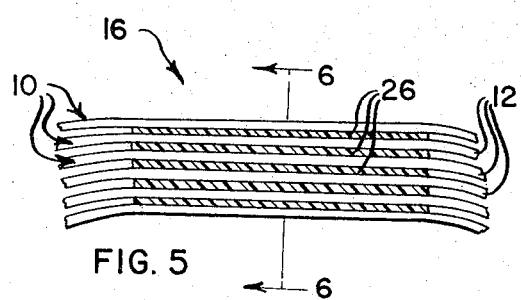
FIG. 5
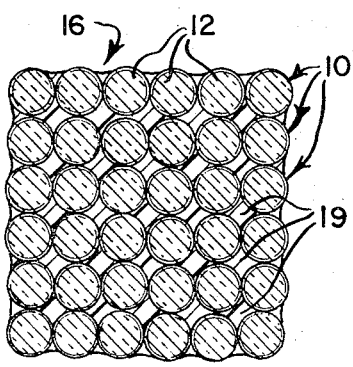
FIG. 6
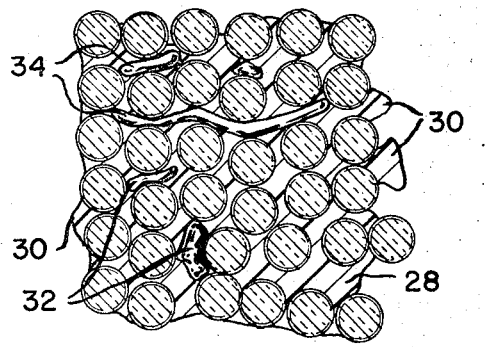
FIG. 7 (PRIOR ART)
INVENTOR.
GEORGE J. CARPENTER

United States Patent Office 3,729,356
Patented Apr. 24, 1973

3,729,356
METHOD OF MAKING CEMENTED FIBER OPTICAL DEVICES
George J. Carpenter, Southbridge, Mass., assignor to American Optical Corporation, Southbridge, Mass.
Filed Mar. 8, 1971, Ser. No. 121,812
Int. Cl. B32b 17/04
U.S. Cl. 156—296                    5 Claims

ABSTRACT OF THE DISCLOSURE

Fabricating coherent bundles of cemented together ribbons of optical fibers wherein a connecting cement is screened onto a section of the length of each ribbon, squeegeed to the exact thickness of the screen and allowed to become at least partially dried with the screen in place. Removal of the screen then leaves a clean and even coating of the cement upon each ribbon for adversely securing the ribbons together as a coherent cemented assembly.

BACKGROUND OF THE INVENTION

Field of the invention

Fiber optics with particular reference to a method of making coherent bundles of cemented together optical fibers.

Description of the prior art

A preferred method of making coherent fiber optic bundles involves the forming of a plurality of endless ribbons of juxtaposed convolutions of optical fiber, cementing these convolutions together throughout a relatively short section of their lengths, stacking corresponding cemented sections of the ribbons together, bonding these sections, e.g. by curing the cement, and cutting transversely approximately centrally through the interconnected sections to form opposite identically geometrically patterned end faces of a resulting fiber optic bundle (see U.S. Pat. No. 3,033,731). This and other prior art cementing processes, however, have the attending problems of non-uniform thicknesses of cement occurring between layers or ribbons of the fibers, airborn dust, lint and similar contaminates becoming entrapped in these areas of cementing as well as bubbles and impurities in the adhesive and hair or brush bristles from brushes normally used to apply the adhesives to the ribbons. Such inclusions produce excessive interstitial non-light-conducting spaces or areas in a resulting fiber bundle which decrease the amount of light capable of being transmitted through any given portion of the bundle. This, in the case of image transmission, also seriously adversely affects the resolution and definition of optical images transported by the bundle.

An objective of the present invention is, accordingly, to avoid the aforesaid disadvantages and drawbacks of prior art cementing techniques wherewith fiber bundle coherency is dramatically enhanced and scrap yield correspondingly minimized together with the feature of simplifying fiber bundle fabrication procedures.

SUMMARY OF THE INVENTION

The aforesaid objective is accomplished by cementing together the convolutions of endless fiber ribbons by squeegeeing a cement through screening (e.g. a silk screen) upon the ribbons wherewith the layer thickness of the applied cement corresponds uniformly to the uniform thickness of screen used. With stenciling, the screen is arranged to produce sharp cut-off lines of demarcation between cemented and uncemented lengths of the ribbons. The cement is allowed to at least partially dry under the protection of the screen whereupon the screen is peeled away. This leaves a clean, even coating of cement upon each ribbon which is immediately available for stacking with coatings of similarly treated fiber ribbons for producing a finished fiber optic bundle assembly.

In addition to providing the aforesaid uniform coating thickness of cement in the case its application to each fiber ribbon, stripping the screening from respective ribbons of fiber automatically removes bubbles and particulate contaminants occurring in the cement itself as well as a major portion of incident air born dust and similar contaminants.

The invention will be more readily understood by reference to the following description taken in conjunction with the accompanying drawing.

DESCRIPTION OF THE DRAWING

FIG. 1 is an illustration, in perspective, of an operation involving the method of the present invention;

FIG. 2 is an enlarged cross-sectional view taken along line 2—2 of FIG. 1;

FIG. 3 is an enlarged cross-sectional view taken along line 3—3 of FIG. 1;

FIG. 4 is a perspective illustration of an endless ribbon of juxtaposed convolutions of optical fibers following treatment thereof according to principles of the present invention;

FIG. 5 is a fragmentary partially cross-sectional elevational view of an assembly of a plurality of endless ribbons of the type illustrated in FIG. 4;

FIG. 6 is an end view of a cemented bundle of optical fibers resulting from practice of the present inventive concept; and FIG. 7 illustrates an end view of a bundle of optical fibers formed by a prior art cementing technique wherein a number of defects typical of those resulting from the practice of such techniques are depicted.

DESCRIPTION OF THE PREFERRED EMBODIMENTS

A method of fabricating cemented bundles of optical fibers to which principles of the present invention may be applied is shown in U.S. Patent No. 3,033,731. In this exemplary case, a number of endless ribbons of juxtaposed convolutions of optical fiber are formed upon a winding drum, removed from the drum and stacked one within or one over another as the assembled bundle.

The aforesaid method is illustrated in FIGS. 1, 4 and 5 of the present drawing wherein endless ribbons 10 of optical fiber 12 are formed upon drum 14 (FIG. 1), removed from the drum (FIG. 4) and assembled into a bundle 16 (FIG. 5).

Before removing ribbons 10 from drum 14, their respective convolutions are required to be adhesively secured together throughout given sections of corresponding lengths of the ribbons so as to retain the integrity of each ribbon during and following its removal from the winding drum.

The foregoing is accomplished according to principles of the present invention as follows:

A screen 18 is placed over each ribbon 10 (FIG. 1) and a suitable cement 19 is squeegeed through the screen onto the ribbon (FIG. 2). The screen 18 preferably comprises a relatively long and thin strip of foraminous material, e.g. a silk screen of approximately 200 mesh count. The strip, being somewhat wider than ribbon 10, is extended lengthwise along the ribbon. Opposite end portions 20 of each screen 18 are preferably stenciled, i.e. their foramina are filled, with a conventional silk screen stenciling material. Foramina of centermost portions 22 of screens 18 are left clear and sharp lines of division 24 are produced between stenciled and unstenciled portions 18 and 22 respectively. The length of unstenciled portion 22, in each case, is controlled according to the extent of covering desired or ribbon 10 with cement 19 which ultimately produces cemented section 26 thereof (FIGS. 1 and 4).

With a view to utilizing the cemented section 26 for the twofold purpose of maintaining the aforementioned integrity of ribbons 10 and providing means for securing the ribbons 10 together as bundle 16 (FIG. 5), an epoxy resin of the well-known two stage curing type commonly referred to as a "B-stage" epoxy is selected for application to ribbons 10 through unstenciled portions 22 of screens 18. This cement contains a solvent permitting it to be applied in solution. The solvent is adapted to dry at normal room temperature, or slightly above, rendering the resin adhesively varnish-like in consistency and adaptable to subsequent permanent hardening when polymerized, i.e. cured by heating to 250° F., or thereabout.

Following application of the cement, e.g. epoxy, to portions 22 of screens 18, it is squeegeed to the exact thickness of the screens as shown in FIG. 2. Thus, air bubbles and/or particulate matter happening to occur in the cement 19, in sizes larger than the mesh size of screen 18, is wiped away by the action of squeegeeing. The cement 19, so applied, is permitted to at least partially dry. Screen 18 is then stripped away from ribbon 10 (FIG. 3) carrying with it at least the major portion of air born dust and other contaminants happening to accumulate thereon during drying of the cement. If desired, a protective cover 25 of paper or the like may be placed over cement 19 to prevent its contamination during drying. This cover, shown by dot-dash outline in FIGS. 2 and 3, will be carried with screen 18 when the latter is stripped from ribbon 10 (FIG. 3).

With cemented sections 26 thus stenciled upon ribbons 10, the ribbons are removed from drum 14 and assembled one within or one over another having their respective corresponding cemented sections 26 superimposed. This produces bundle 16 (FIG. 5). The cement is cured by heating as mentioned hereinabove to produce a permanently bonded assembly, an enlarged cross-section of which is shown in FIG. 6. Throughout this cross-section of the bundle 16, uniform accurate vertical and horizontal alignment of fibers 12 is achieved by reason of the initial distribution of cement 19 of each cemented section 26 having been uniform and free of ordinarily encountered inclusions of foreign matter or contaminants.

Heretofore, as illustrated in FIG. 7, unavoidable variations in thicknesses of cement applied to fiber ribbons produced the results of excessive spacings 28 and/or exudates 30 of the cement, each or both of which caused fiber misalignment and excessively large non-light-transmitting areas in the fiber bundle. As it is well known, this contributes to poor resolution and definition of optical images required to be transmitted by the bundle. Similar defects resulting from the entrapment of dust or other particulate matter 32 and/or brush bristles or hair 34 further disrupt fibe alignment (i.e. fiber coherency) and add to the defectiveness of the resulting fiber bundle.

It is to be understood that all reference hereinabove to fiber ribbons is intended to include any array of juxtaposed optical fibers, i.e. whether endless or outstretched with exposed opposite end faces and whether subsequently assembled one within another or stacked one upon another.

Furthermore, the aforementioned screens 18 may be of any desired shape or size other than that illustrated, e.g. as a single sheet adapted to cover several fiber ribbons with one application thereof. Also, they may be formed of any suitable woven, perforated or other foraminous material which is preferably lint-free. Additionally, should it be deemed unnecessary in some instances to produce sharp lines of transition between cemented and un-emented portions of the fiber bundle, the aforementioned stenciling of screens 18 may be dispensed with.

I claim:

1. The method of making bundles of cemented together ribbons of juxtaposed lengths of optical fiber comprising the steps of:
    positioning a covering of foraminous material over corresponding portions of the lengths of each of a plurality of said ribbons of optical fiber intended for cementing together as said bundle;
    applying a cement to said ribbons through said foraminous material;
    squeegeeing over said foraminous material to render respective foramina thereof filled with said cement where applied thereto and remove thicknesses of said foraminous material;
    awaiting at least partial hardening of said cement;
    stripping said foraminous material away from each of said ribbons, leaving cemented sections respectively thereon;
    stacking said ribbons with corresponding cemented sections thereof superimposed; and
    curing the cement of said sections to adhesively bond one to another and to adjoining portions of said fiber ribbons as said fiber bundle.

2. The method according to claim 1 wherein said covering is a screen.

3. The method according to claim 2 wherein said screen is formed of woven silk thread.

4. The method according to claim 1 wherein foramina of said covering material are sealed in at least one portion of the material over an area extending up to and forming a straight boundary line across said material wherewith said application and squeegeeing of said cement through said foraminous material produces cemented sections on said ribbons each having a discrete boundary corresponding to said line across said foraminous material.

5. The method according to claim 4 wherein said boundary lines of said cemented sections are aligned in said fiber bundle.

References Cited
UNITED STATES PATENTS

| | | | |
|---|---|---|---|
| 3,383,192 | 5/1968 | Siegmund | 65—4 |
| 3,580,775 | 5/1971 | Siegmund | 65—4 X |
| 2,052,933 | 9/1936 | Louft | 117—38 X |
| 3,393,167 | 7/1968 | Varron et al. | 117—38 X |

ALFRED L. LEVITT, Primary Examiner

C. WESTON, Assistant Examiner

U.S. Cl. X.R.

65—4; 117—38; 156—305

UNITED STATES PATENT OFFICE
CERTIFICATE OF CORRECTION

Patent No. 3,729,356                    Dated April 24, 1973

Inventor(s) George J. Carpenter

It is certified that error appears in the above-identified patent and that said Letters Patent are hereby corrected as shown below:

In claim 1, line 23, after "thickness of said" insert --cement in excess of the thickness of said--.

Signed and sealed this 11th day of September 1973.

(SEAL)
Attest:

EDWARD M. FLETCHER, JR.
Attesting Officer

RENE D. TEGTMEYER
Acting Commissioner of Patents